Jan. 23, 1923.
W. A. GEIGER.
SIDE BEARING.
FILED JAN. 23, 1920.
1,442,874
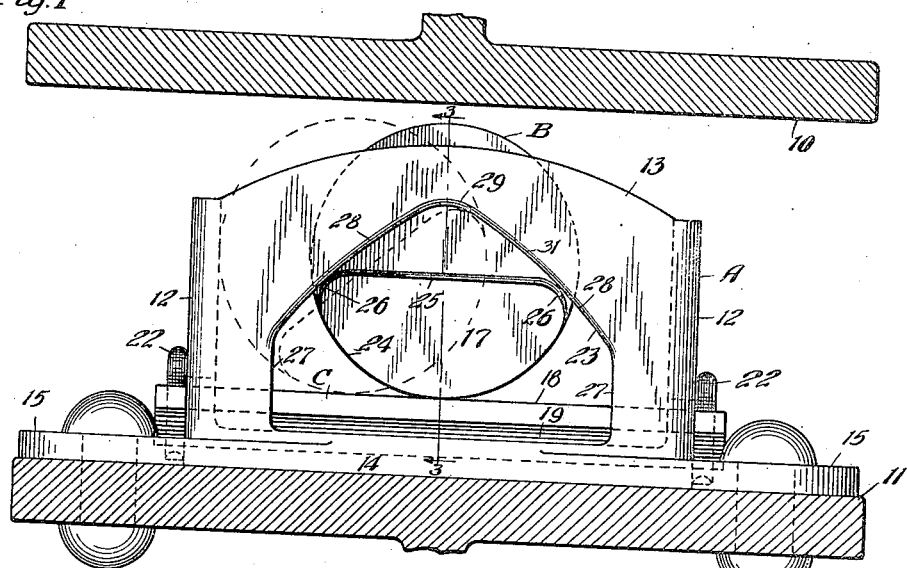
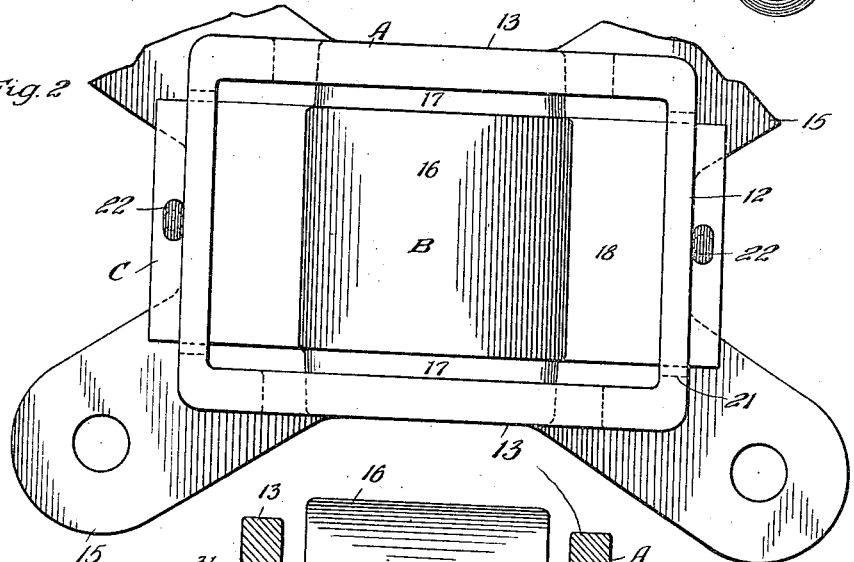
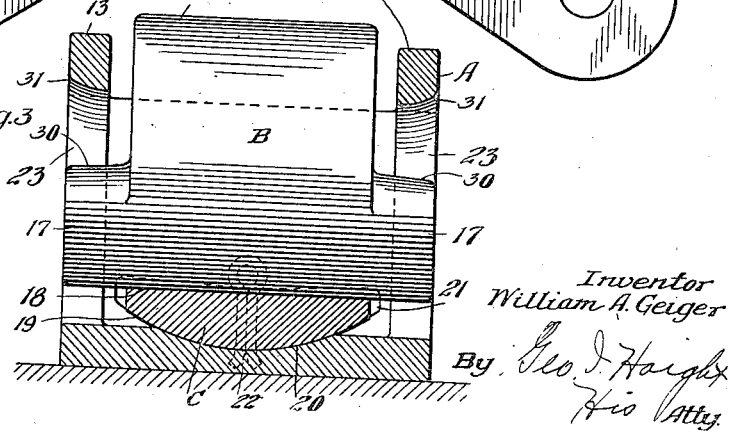
Witnesses
F. B. Townsend
Inventor
William A. Geiger
By Geo. I. Haight
His Atty.

Patented Jan. 23, 1923.

1,442,874

UNITED STATES PATENT OFFICE.

WILLIAM A. GEIGER, OF CHICAGO, ILLINOIS, ASSIGNOR TO WILLIAM H. MINER, OF CHAZY, NEW YORK.

SIDE BEARING.

Application filed January 23, 1920. Serial No. 353,441.

*To all whom it may concern:*

Be it known that I, WILLIAM A. GEIGER, a citizen of United States, residing at Chicago, in the county of Cook and State of Illinois, have invented a certain new and useful Improvement in Side Bearings, of which the following is a full, clear, concise, and exact description, reference being had to the accompanying drawings, forming a part of this specification.

This invention relates to improvements in side bearings.

The object of the invention is to provide an efficient and automatically self-centering and self-alining anti-friction bearing especially adapted for use as a side bearing on railway cars and wherein is employed a minimum number of parts of substantial construction, the bearing being free from springs or other devices likely to break or easily get out of order.

In the drawing forming a part of this specification, Figure 1 is a vertical sectional view taken through the ends of a body and a truck bolster of a car showing my improvements in connection therewith. As shown in this view, the side bearing is applied to the truck bolster. Figure 2 is a top plan view of the improved bearing proper, parts being broken away in order to accommodate the figure on the sheet. And Figure 3 is a vertical sectional view taken substantially on the line 3—3 of Figure 1.

In said drawing, 10 denotes the under side of a body bolster and 11 the upper side of a truck bolster, both being related in the usual manner of body and truck bolsters of a car. The improved bearing, which is preferably attached to the truck bolster, comprises, broadly, a base casting, housing or retaining member designated generally by the letter A; an anti-friction element designated by the letter B; and an adjustable bearing plate designated by the letter C.

The housing or retaining member A, as shown, is of substantially hollow box-like form having end walls 12—12, side walls 13—13, a bottom wall 14, and corner lugs 15—15, the latter being perforated to accommodate rivets or other suitable securing devices.

The anti-friction element, as shown, is preferably in the form of a one-piece cast roller of cylindrical form having a main cylindrical body or section 16 and laterally extended projections 17—17 at its ends. The projections or lugs 17, as clearly indicated in the drawing, are disposed below the center of the rolling element so as to thereby act as overbalances or counterweights in returning the anti-friction element to its central normal position after each actuation and upon release of the actuating pressure. As clearly seen from Figure 3, the length of the main part of the element B is appreciably less than the distance between the side walls 13 so as to thereby permit the tilting or lateral adjustment of the anti-friction element with respect to the member A.

The tilting action of the anti-friction element B is obtained by means of the plate C. The latter is provided on its upper side with a flat bearing seat or surface 18 and on its under side is made convex as indicated at 19. The bottom wall 14 of the member A is provided with a cooperating concave groove 20 as shown in Figure 3. The convex and concave cooperating surfaces of the plate and bottom wall of the member A extend lengthwise of the member A, that is, transversely of the bolsters and transversely of the axis of the anti-friction element B. With this construction it is evident that the anti-friction element B is adapted to tilt or rock and thereby present its upper bearing surface always in full line contact with the under surface of the body bolster. This is of importance in railway side bearings because of the fact that it is difficult to obtain perfect alinement between the bearing surfaces of the opposed bolsters and furthermore, even if such alinement is obtained at the time the bearings are applied, the alinement is frequently lost because of wear in the various parts of the bolsters and also because of deflection in the bolsters due to the loads thereon. With my construction, full line bearing contacts are maintained between the anti-friction element B and the body bolster on the one hand and between the anti-friction element B and the plate C on the other hand. This is accomplished without the use of any weak elements and it will be noted that both the anti-friction element B and the plate are always under compression, thereby affording maximum strength in the construction.

The plate C extends through suitable openings 21—21 in the end walls of the member A, said openings being slightly larger than the plate C in order to accommodate movements of the latter. Accidental removal of the plate C is prevented by means of cotters 22—22 passed through the projected ends of the plate C, as clearly indicated in Figures 1 and 2.

It is also highly desirable to prevent any bodily shifting of the anti-friction element B, that is, not only must the element B be brought to its upright normal position after each actuation but it must be brought to this position at the central point in the retaining member A in order to permit of full movement of the anti-friction element at any time it is brought into action. To accomplish this result, the extended projections 17 are made of peculiar form and cooperate with peculiarly formed recesses or openings 23—23 in the side walls of the member A. It will be noted that in end elevation, each projection 17 has a lower curved edge 24 concentric with the surface of the element B; an upper horizontally extending edge 25; and arcuate edges 26—26 uniting the horizontal edge 25 with the curved edge 24. The contour of each opening or recess 23 includes vertically extending edges 27—27 and upwardly converging slightly curved edges 28—28 which merge as indicated at 29. The edges 28—28 of the openings 23, are, in effect, generated by points in the curved edges 26—26 of the projections 17. In normal position of the anti-friction element B, as shown in Figure 1, the curved edges 26—26 of the projections 17 are in what may be termed loose contact with the edges 28—28 of the openings 23 so that, the anti-friction element B cannot be shifted bodily horizontally so long as the element B maintains its normal balanced position. As the anti-friction element B is rolled to either side, as for instance to the left as viewed in Figure 1, the lefthand edge 28 is made to conform with the path of movement of the lefthand curved edge 26 and similarly the righthand edge 28 of the opening 23 is made to conform to the path traveled by the righthand curved edge 26 of the projection 17. In other words, in any position of the anti-friction element less than its extreme limit of movement, there will be two points of contact between each projection 17 and the edges of the opening 23 and of course a point of contact between the curved edge 24 of each projection and the adjustable plate C. By maintaining this three-point contact, the anti-friction element B cannot be shifted bodily at any point in its travel. The final movement of the anti-friction element B is preferably limited by engagement of the element B with the end wall of the member A and also by the simultaneous positioning of the horizontal edges 25 of the lugs 17 against one of the corresponding edges 28 of the openings 23.

In order to prevent binding of the parts and to permit the action just described, the upper horizontal edges 25 of the lugs 17 are downwardly and outwardly tapered or beveled as indicated at 30—30 in Figure 3 and the edges 28—28 defining the openings 23 are slightly outwardly flared in transverse section as indicated at 31—31 in Figure 3. With this arrangement, when the anti-friction element B extends perfectly horizontally, the contact between the lugs 17 and the edges of the openings 23 will be approximately in planes coinciding with the inner surfaces of the side walls 13 but as the roller is tilted, the points of contact will move slightly outwardly because of the tapered and flared formations hereinbefore mentioned.

Another important feature of my invention and which contributes to its simplicity, is the method of assembling the parts and holding them in assembled relation. In assembling the side bearing, the anti-friction element is first dropped within the retaining member A in a position at right angles to the normal position assumed by the element B, that is with the lugs 17—17 extending lengthwise of the member A. This is done before the plate C is inserted. The anti-friction element B is then turned through an angle of 90° which can be done because of the fact that the anti-friction element is in a lower position than that which it normally occupies. After the element B has thus been turned to its proper position, it is elevated and the plate C then inserted lengthwise, thus holding the parts in assembled position and eliminating possibility of any part assuming an improper position.

It will be noted that in my improved side bearing, I employ only three parts each of which is of substantial construction and may be cheaply manufactured and no part is subjected to any strain other than compression.

Although I have herein shown and described what I now consider the preferred manner of carrying out the invention, the same is merely illustrative and I contemplate such changes and modifications as come within the scope of the claims appended hereto.

I claim:

1. In a side bearing, the combination with a hollow retaining member adapted to be secured to a bolster and having the side walls thereof provided with recesses, the edges of said recesses being flared outwardly; of an anti-friction element adapted to roll back and forth within said member and having overbalancing projections at its ends extending within said recesses, said projections being downwardly and outwardly tapered on their top edges when the element is in normal position, the contours of said projections and the edges defining the recesses being so formed that two points of light contact between each projection and the corresponding recess is maintained in all positions of the anti-friction element; and means associated with said element and the retaining member forming an adjustable bearing seat for said element to permit the latter to tilt laterally.

2. In a side bearing, the combination with a hollow retaining member adapted to be secured to a bolster and having the side walls thereof provided with recesses, the edges of said recesses being flared outwardly; of an anti-friction element adapted to roll back and forth within said member and having overbalancing projections at its ends extending within said recesses, said projections being downwardly and outwardly tapered on their top edges when the element is in normal position, the contours of said projections and the edges defining the recesses being so formed that two points of light contact between each projection and the corresponding recess is maintained in all positions of the anti-friction element; and means associated with said element and the retaining member forming an adjustable bearing seat for said element to permit the latter to tilt laterally, said means including a plate removably associated with the retaining member, said plate having its under side convex in transverse section and the bottom of said member having a corresponding concave groove.

In witness that I claim the foregoing I have hereunto subscribed my name this 5th day of Jan. 1920.

WILLIAM A. GEIGER.

Witness:
CARRIE GAILING.